United States Patent [19]
Weber

[11] Patent Number: 5,423,347
[45] Date of Patent: Jun. 13, 1995

[54] THREADED INSERTION VALVE

[76] Inventor: Günter Weber, Hauptplatz 23, A-2474 Gattendorf, Austria

[21] Appl. No.: 66,002
[22] PCT Filed: Nov. 29, 1991
[86] PCT No.: PCT/AT91/00122
    § 371 Date: May 25, 1993
    § 102(e) Date: May 25, 1993
[87] PCT Pub. No.: WO92/09836
    PCT Pub. Date: Jun. 11, 1992

[30] Foreign Application Priority Data
Nov. 30, 1990 [AT] Austria ................... 2433/90
Feb. 4, 1991 [AT] Austria ................... 236/91
Jul. 3, 1991 [AT] Austria ................... 1330/91

[51] Int. Cl.⁶ .................... F16K 31/06; F16K 31/40
[52] U.S. Cl. .................... 137/454.5; 137/102; 137/614.2; 251/30.04
[58] Field of Search ............ 137/454.5, 102, 107, 137/614.2, 614.21; 251/30.04

[56] References Cited
U.S. PATENT DOCUMENTS
4,023,586  5/1977  Nemetz et al. ........... 137/614.2 X
4,592,533  6/1986  Guglielmi et al. ........ 251/30.01
4,723,640  2/1988  Beck .................... 137/614.2 X
4,725,039  2/1988  Kolchinsky ............. 137/454.2 X
5,172,724 12/1992  Tsuzuki et al. ......... 137/614.2

FOREIGN PATENT DOCUMENTS
0136473  8/1984  European Pat. Off. .
2518695  6/1983  France .
3428096  3/1985  Germany .

Primary Examiner—Stephen Hepperle
Attorney, Agent, or Firm—Karl Hormann

[57] ABSTRACT

Threaded insertion valve with a substantially tubular threaded insertion part (2) provided with an external thread (4) for screwing into a valve receptacle and with a flanged part (2) abutting on the threaded insertion part (2) and integral therewith and provided with a central bore (6) for penetration by a valve spindle (7), the bore (6) of the flanged part (3) being provided with an internal thread (8) for receiving a housing (10) of an actuator apparatus (11) axially acting on the valve spindle (7) and provided at an end with an external thread (9), and/or the threaded insertion part (2) being provided with an internal thread (21) for screwing in of an exchangeable substantially tubular valve seat body (24).

9 Claims, 9 Drawing Sheets

THREADED INSERTION VALVE

The invention relates to a threaded insertion valve having a substantially tubular threaded insertion part provided with an external thread to be screwed into a valve receptacle and a flanged part adjacent to and integral with the threaded insertion part which is provided with a central bore to be penetrated by a valve spindle.

Known valves of the kind (cartridge valves) are designed for a particular field of application and for a defined function. Hence, there exist a great many valve types for fluids designed as cartridge valves such as hydraulic or pneumatic servo and control valves. It is necessary for each kind of valve to manufacture a basic valve body consisting of a threaded part and a flanged part into which valve spindles, valve seat bodies or valve spindle actuators, as the case may be, are inserted. On the part of a manufacturer, such valves place a high burden of conversion when changing production from one kind of valve to another, on the part of a supplier such valves place a burden of a large inventory stock, and on the part of a customer the valves place a great burden of logistics in the design of appropriate valve control circuits. On the other hand, the different insert dimensions of the basic valve bodies required for different kinds of valves complicate the design and layout of valve control circuits incorporating threaded insert valves. Finally, the assembly of the known valves is accomplished in part by brazing or welding individual valve parts together; more particularly, conventional valve spindle actuators are brazed to the flange part of the valve so that a replacement of defective functional elements is no longer possible without destroying the valve.

It is an object of the invention to provide for a threaded insert valve of the kind referred to which, having non-varying standardized external dimensions, may perform different functions of conventional threaded insertion valves without requiring elaborate conversions, and which ensures a simple assembly, as well as easy exchange of those elements required to convert the valve to accommodate predetermined functions.

In accordance with the invention the object is accomplished either by the bore of the flanged part being provided with an internal thread for receiving a substantially tubular housing of an actuator provided at one end with an external thread and axially acting upon the valve spindle and/or by the threaded insert part having an internal thread for threadedly receiving an exchangeable substantially tubular valve seat module.

In accordance with the invention, there is provided a base module for a threaded insertion valve which is capable of receiving different valve actuating apparatus and valve spindle/valve seat module arrangements, the exterior configuration and the external dimensions of the threaded insertion part and of the flanged part being the same for each functional kind of threaded insertion valve and the valve function elements being exchangeable in a simple manner. Because of the modular division of the threaded insertion valve in no more than four threaded elements, viz.: the actuator, the flanged and threaded insertion valve body parts, the valve seat body and the valve spindle, any required kinds of valves may be put together in a modular fashion.

Since in practice it is not usually necessary to provide flanged and threaded insertion parts in different dimensions, the structure of the threaded insertion valve may be simplified and, consequently, the burdens of inventory and logistics in respect of the basic elements may be reduced, if as taught by the instant invention the choice of parts needed to be combined is reduced to three.

Another object of the invention is, by a further development of the valve module elements defining the valve function, to structure the threaded insertion member described above in such a manner that the basic functions for the drive of the lifting cylinder are already integrated in this valve. This object is accomplished by characteristics of a change-over valve which also functions as a discharge valve integrated in the control valve.

Advantageous embodiments of the invention have been defined in the subclaims.

The invention will now be described in greater detail on the basis of embodiments depicted by the appended drawings. In the drawings

Figure 1:
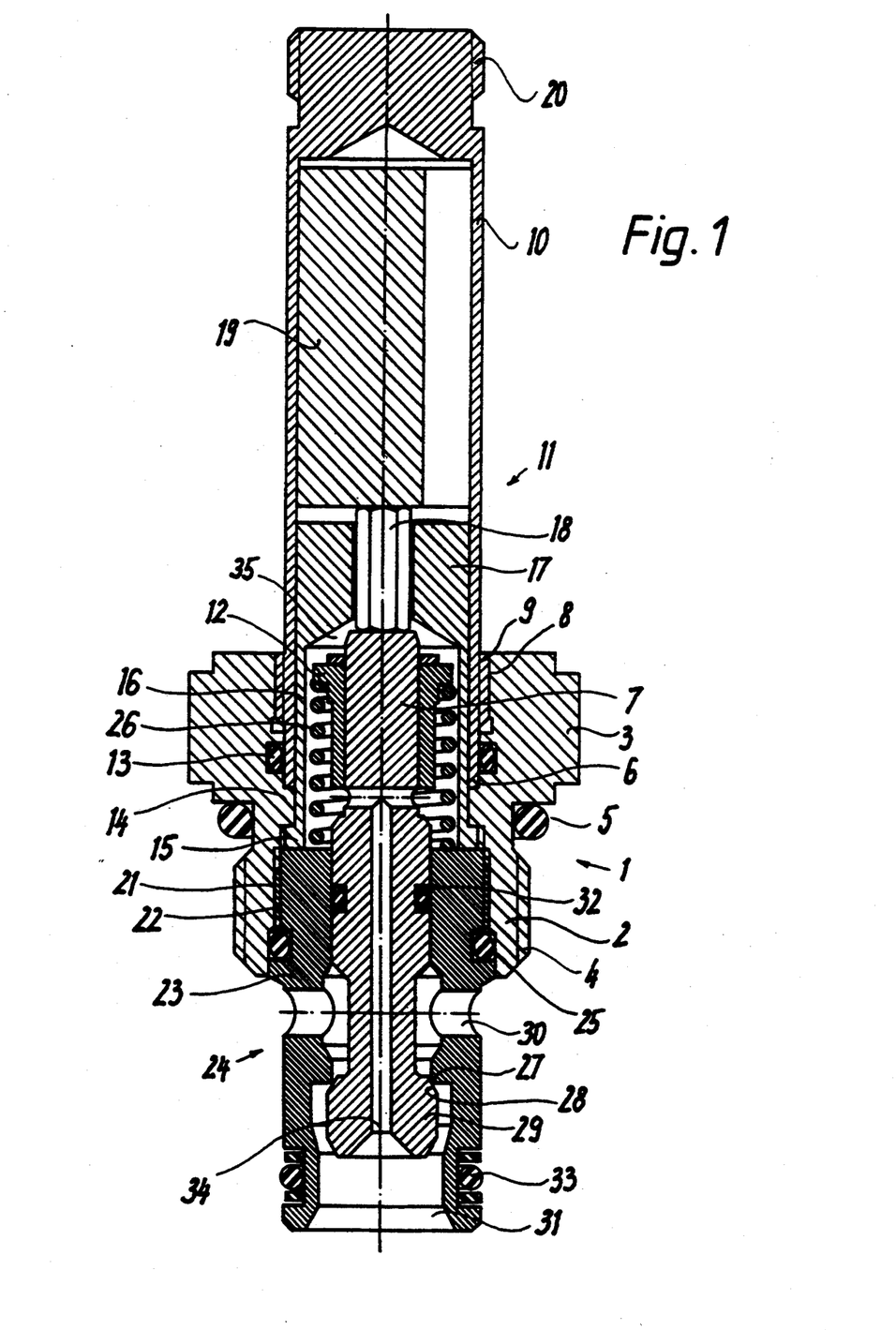
FIG. 1 is a longitudinal section through a first embodiment of the invention having the function of a pressure compensated double-blocking two position - two way valve with magnetic actuation.

As shown in FIG. 1 the threaded insertion valve is provided with a one-piece basic valve body i composed by a substantially tubular threaded insertion part 2 and a flanged part 3 in engagement therewith. The threaded insertion part 2 is provided with an external thread 4 to be screwed into a valve receptacle (not shown), and the flanged part 3 is externally structured as a hexagonal nut to allow engagement with a tool. In the transitional portion between threaded insertion part 2 and flanged part 3 a sealing ring 5 is slipped onto the threaded insertion part.

The flanged part 3 is provided with a central bore 6 with a valve spindle 7 penetrating therethrough, or to provide access to this valve spindle 7. The bore 6 in the flanged part is provided with an internal thread 8 for receiving an externally threaded 9 end section of a substantially tubular housing 10, of non-magnetic material, of an actuator apparatus 11 axially acting upon the valve spindle 7 and described hereinafter.

Adjacent the internal thread 8 there is provided within the bore 6 of the flanged part an annular groove within which a sealing ring 13 is seated.

Furthermore, there is provided adjacent the internal thread 8 and the sealing ring 13, on the interior wall of the bore 6 of the flanged part, an inwardly protruding annular shoulder 14 which is engaged by an end flange 15 of a sleeve 16 inserted into the housing 10 of the actuator apparatus 11. At its end opposite the end flange 15 the sleeve 16 is narrowed down to a guide bushing 17 for a prismatic bolt 18 one end of which engages the upper face of the spindle 7 and the other end of which engages a core 19 which is slideably guided within the housing 10.

The guide bushing 17, the bolt 18 and the core 19 constitute the actuator apparatus 11, the sleeve 16 with the guide bushing 17 and the core 19 being made of a magnetizable material, such as soft iron whereas the bolt 18 is made of non-magnetic material. A magnetic coil (not shown) is mounted on the tubular housing 10 and is fixed thereon by a threaded nut (also not shown) threadedly received on an external thread 20 provided at the upper end of the housing 10. When the magnetic coil is electrically excited the guide bushing 17 and the core 19 are magnetized and will be attracted toward each other whereby the bolt 18 and, hence, the valve spindle 7 will be pushed downwardly.

The threaded insertion part 2 is provided with an internal thread 21 for threadedly receiving an exchangeable valve seat body 24 constituted by a tubular member 23 provided at its upper end with an external thread 22. Adjacent the external thread 22 there is provided in the tubular member 23 an external circumferential annular groove within which there is seated a sealing ring 25.

An end surface of the tubular member 23 biases the end flange 15 of the sleeve 16 against the interior shoulder 14 of the bore 6 of the flanged part. The valve spindle 7 is guided within the interior of the tubular member 23 with a compression spring 26 being arranged between the upper surface of the tubular member 23 and an arresting collar 12 affixed to the upper end of the valve spindle. In the depicted position, the compression spring biases the valve spindle 7 upwardly relative to the tubular member 23.

On the interior side of the tubular member 23 there is provided an annular shoulder 27 which serves as a seat for a valve cone 28 formed on the valve spindle 7. The valve cone 28 is formed by an upwardly directed truncated exterior surface of the head 29 of the valve spindle.

In the area between the annular shoulder 27 and the external thread 22 the tubular member 23 of the valve seat body 24 is furthermore provided with fluid discharge ports 30 which constitute one valve port of an valve. The lower mouth or opening 31 of the tubular member 23 constitutes the other valve port.

A slideable seal 32 provided on the exterior circumference of valve spindle 7 seals the guide surface of the valve spindle 7 within the tubular member 23. For sealing the valve receptacle (not shown) sealing rings 33 are provided at the end of the tubular member 23 where the mouth is located.

Upwardly of the valve cone 28 in the area of the fluid discharge ports 30 the valve spindle 7 is provided with a portion of reduced diameter and is penetrated by a central bore 34 which connects the pressure chamber in the area of the mouth 31 of the tubular member on one side of the spindle with a counter pressure chamber 35 at the other side of the spindle and constituted by the chamber in which the end of the spindle 7 is located which is biased by the compression spring 26 and engaged by the bolt 18. The central bore 34 serves to compensate the pressure within the valve so that only the force of the spring 26 need be overcome to open the valve.

Figure 2:
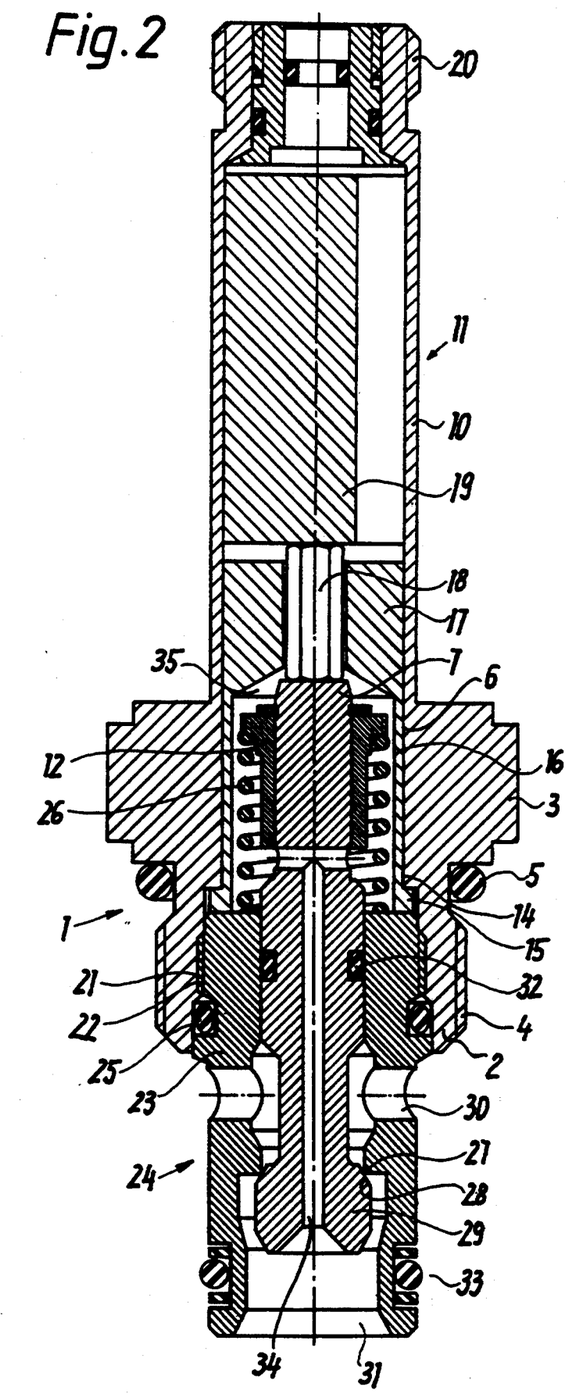
FIG. 2 is a longitudinal section through a second embodiment of the invention having the same valve function as the valves of FIG. 1, with flanged part and threaded insertion part being integrated into the housing of the actuator.

FIG. 2 depicts an embodiment similar to that of FIG. 1, with the flanged and threaded insertion parts 2, 3 in this case being integrally formed with the tubular housing 10 of the actuator apparatus 11.

Figure 3:
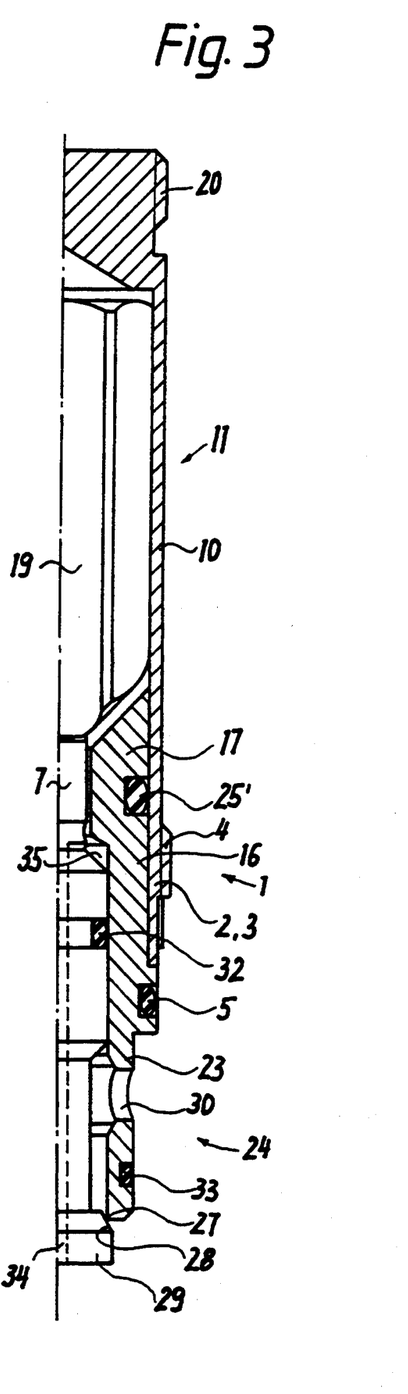
FIG. 3 is one half of a longitudinal section through a third embodiment of the invention having the same valve function as the valves of FIGS. 1 and 2, whereby the housing of the actuator is in direct engagement with the flanged and threaded insertion parts.

FIG. 3 also depicts an embodiment similar to those of FIGS. 1 and 2, except that in this instance the housing 10 directly extends into the flanged and threaded insertion parts 2, 3, i.e., the housing 10 and the flanged and threaded insertion parts 2, 3 form an integral unit. The tubular member 23 of the valve seat body 24 is integrally formed with the sleeve 16 and the guide bushing 17, and the spindle 7 is integrally formed with the bolt 18.

In this embodiment, the tubular member 23 is not screwed into the flanged and threaded insertion part 2, 3, but is only press-fitted. Sealing is accomplished by means of a sealing ring 25'.

In this instance, the valve spindle is biased by a spring (not shown) which is anchored between the face of the valve spindle head 29 and the bottom of the valve receptacle (not shown).

Furthermore, the annular shoulder 27 is formed by the internal edge of the mouth of the tubular member 23. Overall, the embodiment of FIG. 3 is a further simplification of the valve structure which, therefore, ensures all the possible combinations of actuator apparatus, valve seat body and valve spindle.

FIG. 4 again shows a similar embodiment. In this instance, however, the flanged and threaded insertion parts 2, 3 are integrally formed with the valve seat body 24. The bore 6 of the flange is here provided with an internal thread 8 for receiving the housing 10 which at its corresponding end is provided with an external thread 8. Adjacent the internal thread 8 there is machined into the bore of the flanged part an annular groove in which a sealing ring 13 is seated. The end flange 15 of the sleeve 16 extends behind the face of the threadedly-inserted end of the housing 10.

The threaded insertion valves (cartridge valves) depicted in FIGS. 1 to 4 function as pressure compensated two position -two way valves with magnetic actuation. The desired function is chosen by an appropriate combination of the cast valve elements spindle 7, actuator apparatus 11, flanged and threaded insertion part 2, 3 or valve seat body 24, as the case may be. Simply by changing these parts for differently dimensioned or formed parts, different kinds of valves may be realized.

Figure 5:
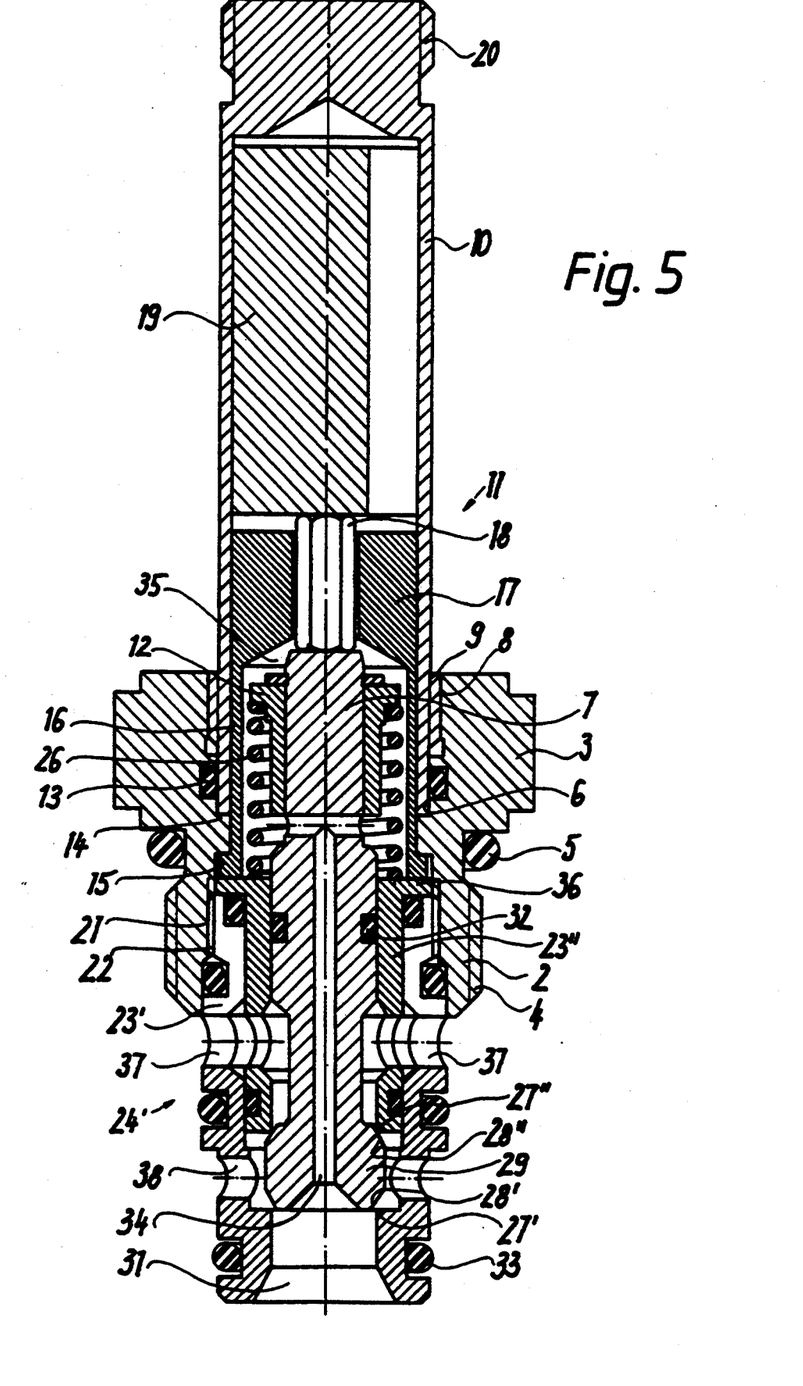
FIG. 5 is a longitudinal section through a fifth embodiment of the invention functioning as a pressure compensated oil leakproof three position - two way valve including magnetic actuation.

For instance, FIG. 5 depicts a further possibility for assembling the basic valve body 1 to result in a pressure compensated three way - two position valve with magnetic actuation. The structure of the basic valve body i comprising a threaded insertion part 2 and a flanged part 3 is identical to the embodiment of FIG. 1. The magnetic actuator apparatus 11 screwed into the flanged part 3 is also identical to that of FIG. 1. The three way - two position valve results from the valve seat body 24' being formed by two telescoping tubular members 23' and 23" whereby, similar to the tubular member 23 of FIG. 1, the outer tubular member 23' is provided with an external thread 22 and an internal annular shoulder 27' which constitutes a seat for a first downwardly facing valve cone 28' of the valve spindle 7.

The inner tubular member 23" has an end flange 36 radially extending beyond the face of the outer tubular member 23' adjacent the thread and, when the outer tubular member 23' is screwed into the threaded insertion part 2, the inner tubular member is thus retained between the tubular member 23' and the internal shoulder 14 of the flanged part 3, with the end flange 15 of the sleeve 16 placed therebetween.

The length of the inner tubular member 23" is such that it ends at some distance from the internal shoulder 27' of the outer tubular member 23' and that it forms, with the inner rim or shoulder 27" of its face end, a seat for an upwardly facing second valve cone 28" of the valve spindle 7.

In their area of overlap the inner and outer tubular members 23" and 23' are provided with aligned radial fluid discharge openings 37, and in the area between its annular shoulder 27' and the inner rim 27" of the face end of the inner tubular member 23" the outer tubular member 23' is provided with further radial fluid discharge openings 38. In this manner there is provided a three way - two position valve with one fluid port being positioned at the mouth 31 of the outer tubular member 23' and the other two fluid ports being formed by the fluid discharge openings 37 and 38.

As can be seen, a three way - two position valve having the same insertion dimensions as a two position - two way valve may be constructed simply by exchanging the unitary valve seat body 24 shown in FIGS. 1-3 for a dual valve seat body 24' as shown in FIG. 5. It is to be especially emphasized that the telescoping arrangement of the two tubular members 23' and 23", the radial extension of the end flange 36 of the inner tubular member 23" beyond the outer tubular member 23' and the threaded insertion of the outer tubular member 23' into the threaded insertion part 2, assure a constant or fixed position of the annular rims or shoulders defining the valve openings. By comparison, conventional methods of converting a two position - two way valve into a three way - two position valve necessitated the threaded insertion of a further annular edge valve seat into the lower valve opening 31 which often led to problems in respect of tightness and stability.

Figure 4:
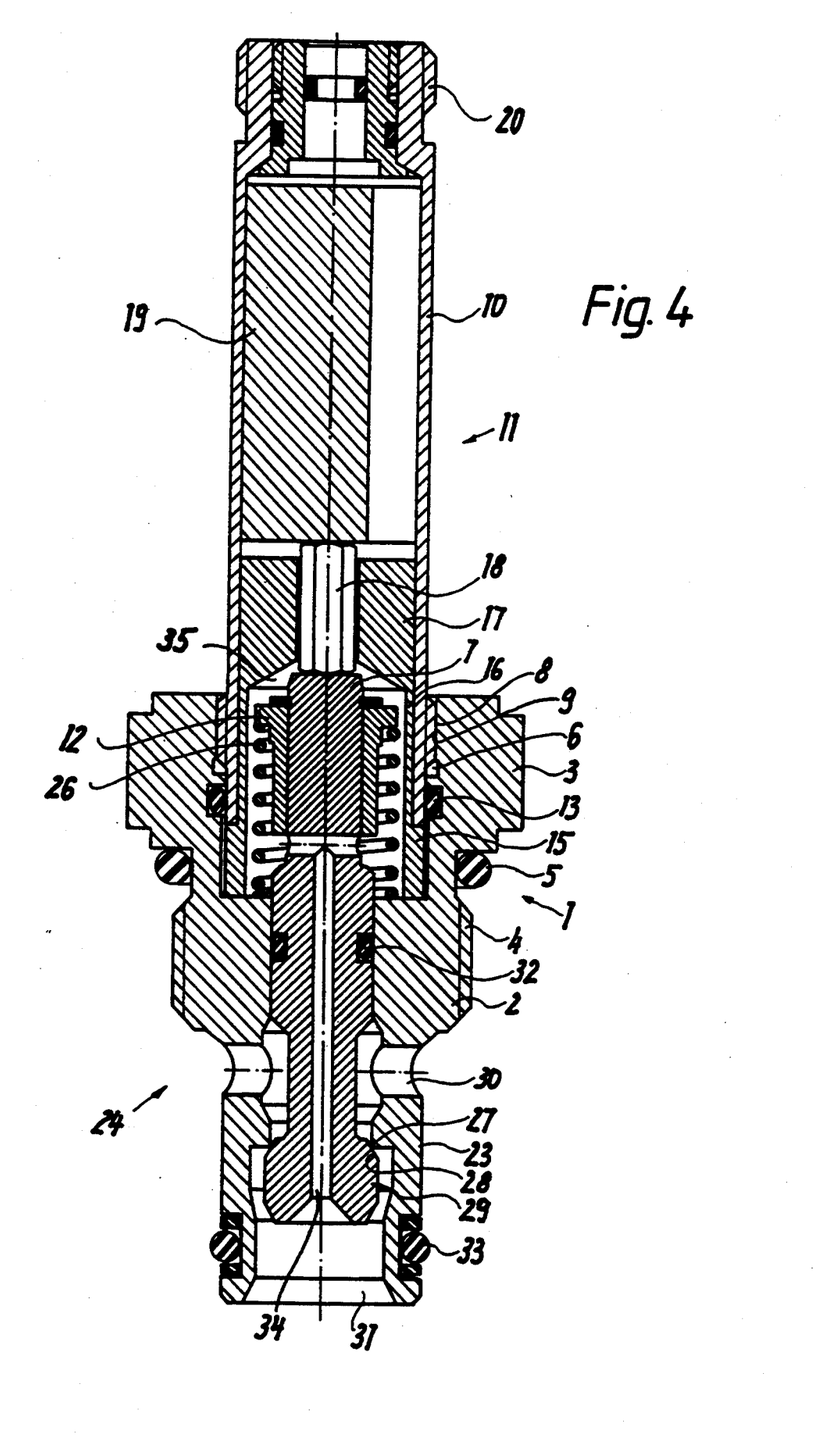
FIG. 4 is a longitudinal section through a fourth embodiment of the invention having the same valve function as the valve of FIGS. 1-3 whereby the flanged and threaded insertion parts are integrally formed with the valve seat body.
Figure 6:
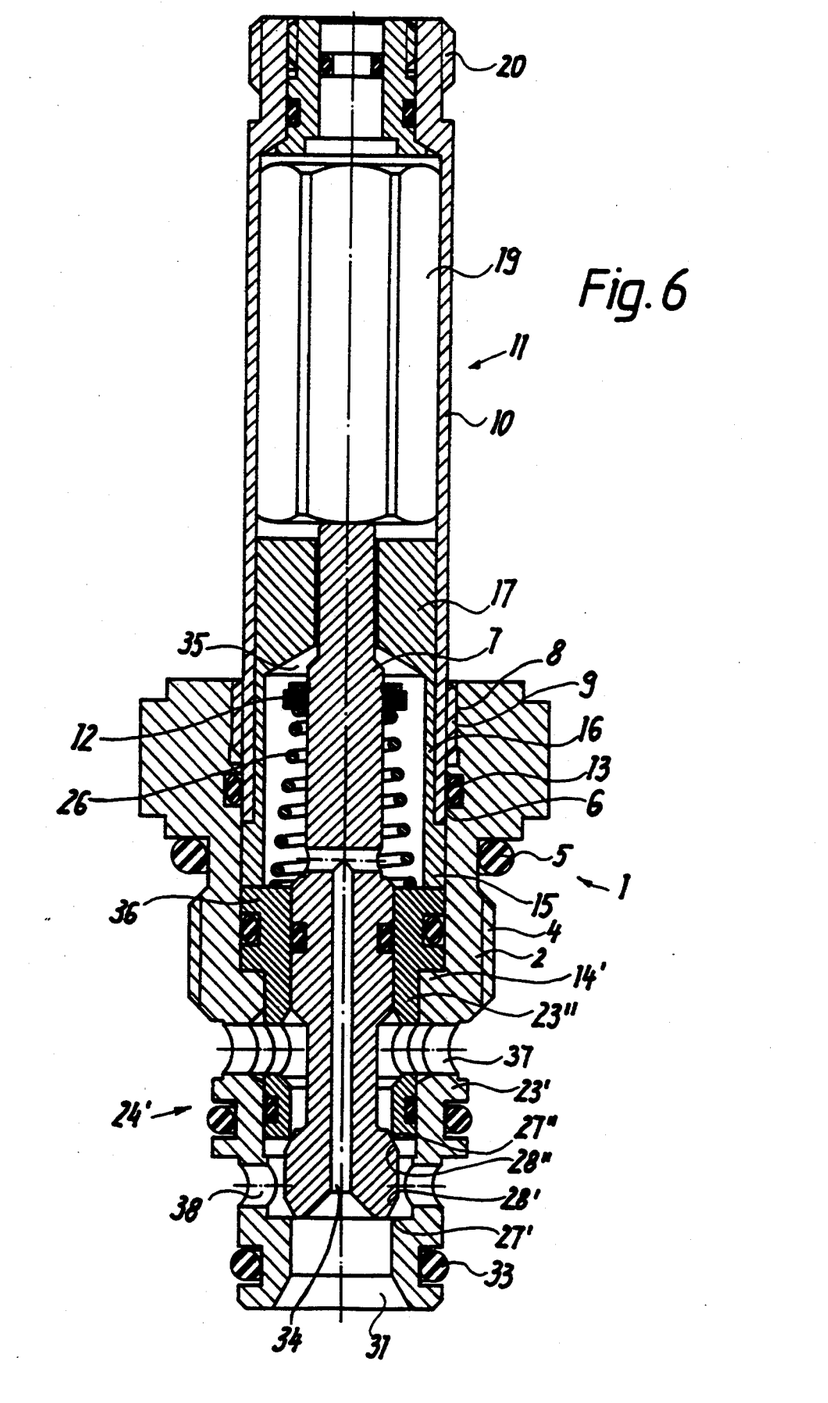
FIG. 6 is a longitudinal section through a sixth embodiment of the invention having the same valve function as the valve of FIG. 5 with flanged and threaded insertion parts being integrally formed with the valve seat body.

FIG. 6 depicts an embodiment similar to the one of FIG. 5, except that the outer tubular member 23' analogously to the tubular member 23 of FIG. 4 is integrally formed with the flanged and threaded insertion member 2, 3 and is provided, in its interior with an annular shoulder 27' which serves as a seat for a first downwardly facing valve cone 28' of the valve spindle 7.

The inner tubular member 23" is provided with a end flange 36 which radially extends beyond an inner shoulder 14' of the outer tubular member 23' and is thus retained between the tubular member 23' and the face end of the housing 10 with the end flange 15 of the sleeve 16 positioned in between.

Figure 7:
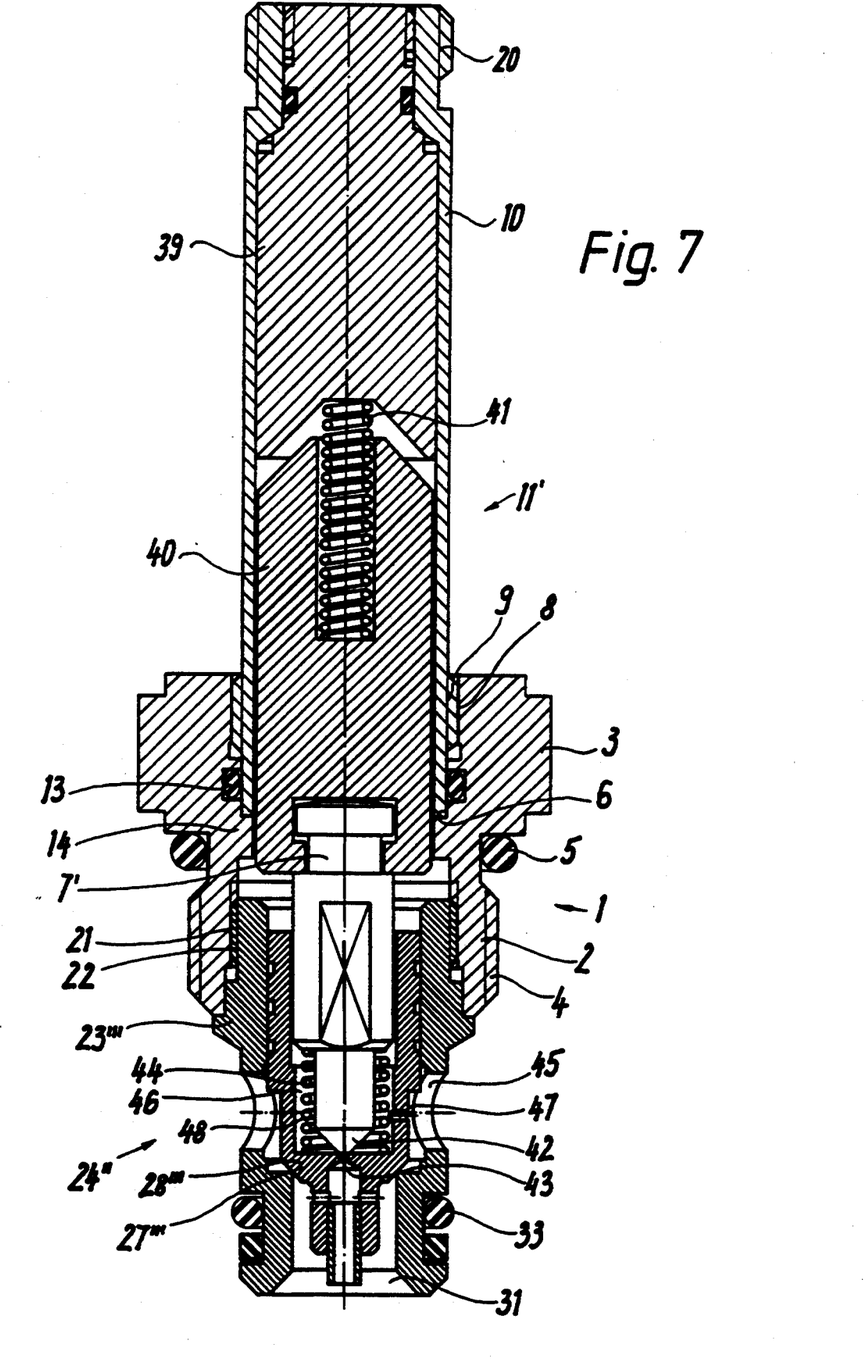
FIG. 7 is a longitudinal section through a seventh embodiment of the invention functioning as a pilot-controlled single blocking two position - two way valve with magnetic actuation.

In FIG. 7 there is depicted a further embodiment of a threaded insertion valve in accordance with the invention and a further application of the basic valve body 1 in accordance with the invention. In this embodiment the valve spindle actuator apparatus 11' is threadedly inserted into the flanged part 3 and consists of two cores 39 and 40 made of a magnetizable material, e.g. soft iron, one of the cores 39 being affixed to the interior of the housing 10, the other core 40 being slideably guided within the housing 10 and biased away from the core 39 by means of a pressure spring 41. A magnetic coil (not shown) is mounted on the housing 10 and, when electrically energized, affects an attraction between the cores 39 and 40.

The lower end of the core 40 embraces the upper end of the valve spindle 7' whereby movement of the core 40 is transmitted to the valve spindle 7'. At its lower end the valve spindle 7' is provided with a valve cone 42 which in its rest position, i.e. when the magnetic coil is not energized, closes a bore 43 of a sleeve 44 and is biased away from it by means of a spring 48. The sleeve 44 is slidingly positioned within a valve seat body 24" constituted by a unitary tubular member 23'". At its lower end the sleeve 44 is provided with a truncated downwardly facing surface 28'" serving as a valve cone which together with an annular shoulder 27'" of the tubular member 23'" provides a valve opening of the valve. Analogously to the previous embodiments the tubular member 23'" is provided with fluid discharge openings 45 in the area between the annular shoulder 27'" and the external thread 22. A pressure chamber 46 within the sleeve 44 behind the bore 43 is connected to the fluid discharge openings 45 by way of a fluid discharge bore 47 of small diameters.

Figure 8:
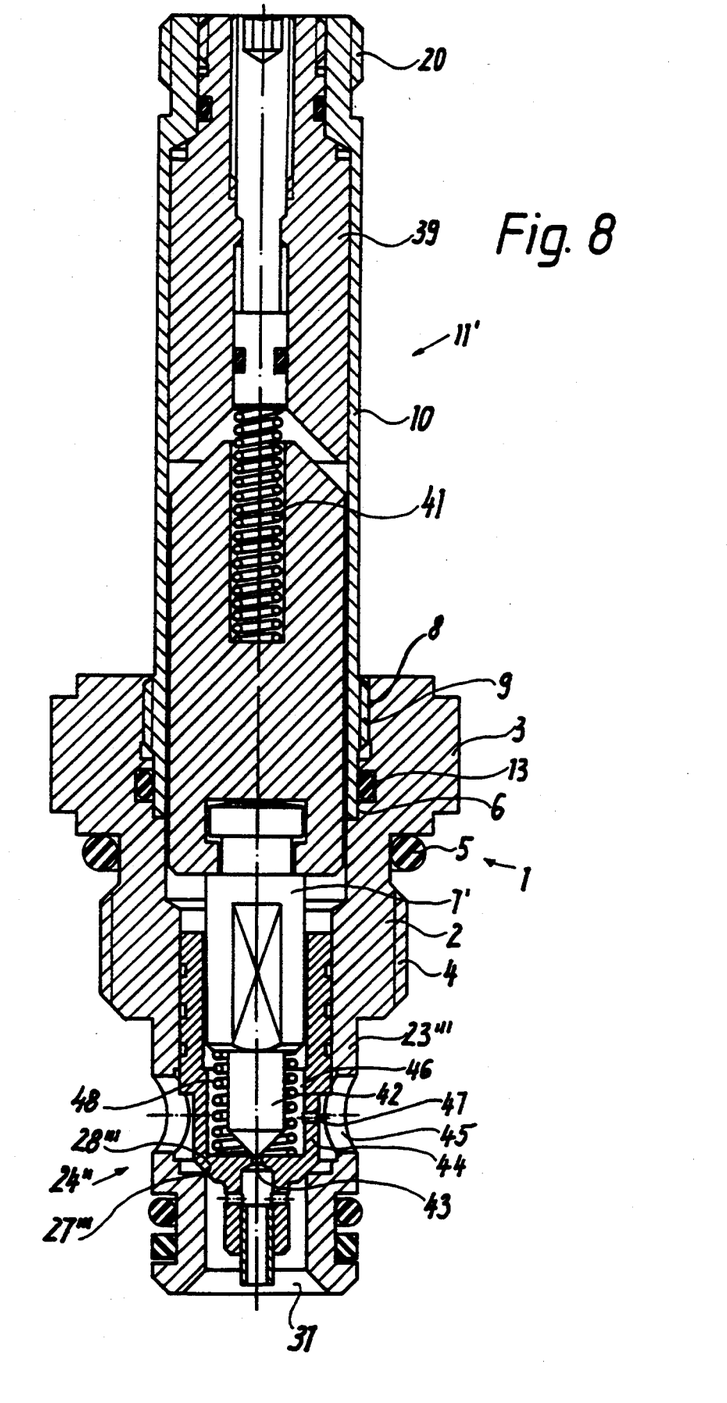
FIG. 8 is a longitudinal section through an eighth embodiment of the invention having the same valve function as the valve of FIG. 7 whereby the flanged and threaded insertion parts are integrally formed with the valve seat body.

FIG. 8 depicts an embodiment similar to that of FIG. 7, the only difference being that in this case the tubular member 23'" is again made of unitary structure with the flanged and threaded insertion parts 2, 3.

The structures of FIGS. 7 and 8 are such that the threaded insertion valve functions as a pilot-controlled two position - two way valve. As long as the pressure acting by way of the bore 47 on the valve cone 42 at the fluid connection of the valve constituted by the fluid opening 45 cannot overcome the force of the spring 41 and as long as the magnet of the actuator apparatus 11 is not energized, the valve remains completely closed because of the pressure extent in the pressure chamber 46. By energizing the magnetic coil (not shown) of the actuator apparatus 11 the core 40 and, hence, the valve spindle 7 are drawn upwardly and the bore 43 is opened whereas the sleeve 44, because of the force of the spring 48, is pressed downwardly and the valve opening between the surface of the valve cone 28'" and the annular shoulder 27'" remains closed. By way of the open bore 43 the pressure now acts on the sleeve 44, on the one hand by way of the opening 45 and the pressure chamber 46 and on the other hand by way of the mouth 31. The force difference resulting from the geometry of the sleeve lifts the sleeve from its seat and opens the valve gap at 27''', 28''' when the force or pressure difference exceeds the force of the spring 48. Thus, only the small force required to lift the valve spindle 7' is needed to open the valve even though it is subjected to the full force of the pressure.

In case of low operating pressures the pilot control would not be necessary and instead of the two-part arrangement of spindle and spindle sleeve a one-part arrangement could be used in which case the conical end 42 of the spindle 7' would act as a valve cone and together with the annular shoulder 27''' would define the valve opening.

Figure 9:
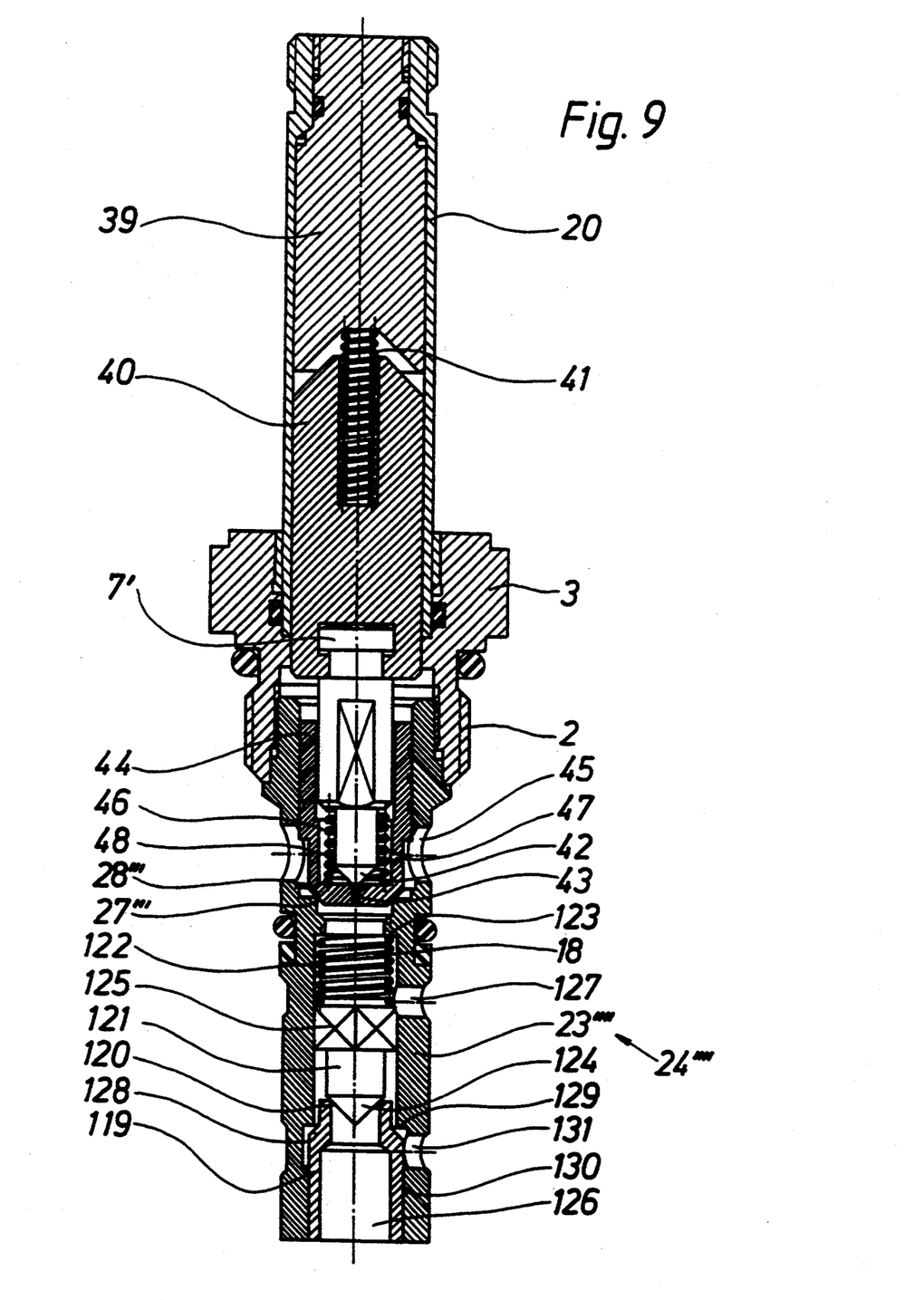
FIG. 9 is a longitudinal section through a ninth embodiment of the invention having the basic control function for the drive of a lifting cylinder.

The threaded insertion valve depicted in FIG. 9 is of substantially similar construction as the valve of FIG. 7, except that it is provided with a special tubular member 23'''' which includes a change-over valve functioning as a discharge valve thus rendering the threaded insertion valve suitable for all basic functions required for the control of a lifting cylinder.

To this end, a sleeve 119 is slideably provided at the lower end inside of the tubular member 23'''', the upper face end of the sleeve 119 forming an annular shoulder 120 as a seat for the valve cone 124 of a second valve spindle 121. The second valve spindle 121 is movable independently of the first valve spindle 7' and is biased against the annular shoulder 120 by a bias spring 122 thus pushing the sleeve into its depicted lower position. The bias spring 122 is supported by an internal abutment 123 in the tubular member 23''''. The valve spindle 121 is retained by a hexagonal member 125 which is axially slideable within the tubular member 23'''' and which at the same time allows an axial flow of fluid.

An opening 126 of the sleeve 119 or of the tubular member 23'''' constitutes a further fluid connection of the valve. In the embodiment shown the tubular member 23'''' is provided, as a further fluid connection, with a radial discharge opening 127 in the area between the first valve gap 27''', 28''' and the second valve gap 120, 124. However, this fluid discharge opening is not required for all applications, but for special applications only.

Near its upper end the outside of the sleeve 119 tapers forming a conical shoulder 128 which together with an internal annular shoulder 129 of the tubular member 23'''' defines a further valve gap 128, 129. In the area between the valve gap 128, 129 and the region 130 of engagement with the sleeve 119 the tubular member 23'''' is provided with a radial fluid discharge opening 131 which constitutes a discharge connection of the valve.

This arrangement constitutes a change-over valve including a discharge valve function: When pressure is applied to the lower connection 126 the valve spindle 121 is lifted and the valve gap 120, 124 is thus opened, and also the sleeve 119 is lifted and the valve gap 128, 129 is closed. When pressure is turned off the bias spring 122 moves the spindle 121 and the sleeve 119 back to their shown initial positions in which, when the switching valve 27''', 28''' is opened, the pressure fluid is discharged by way of the discharge opening or conduit 131.

In this manner a threaded insertion valve is provided which is capable of executing the basic functions of controlling a lifting cylinder, i.e. the function of a releasable check valve provided with a separate discharge conduit.

Figure 10:
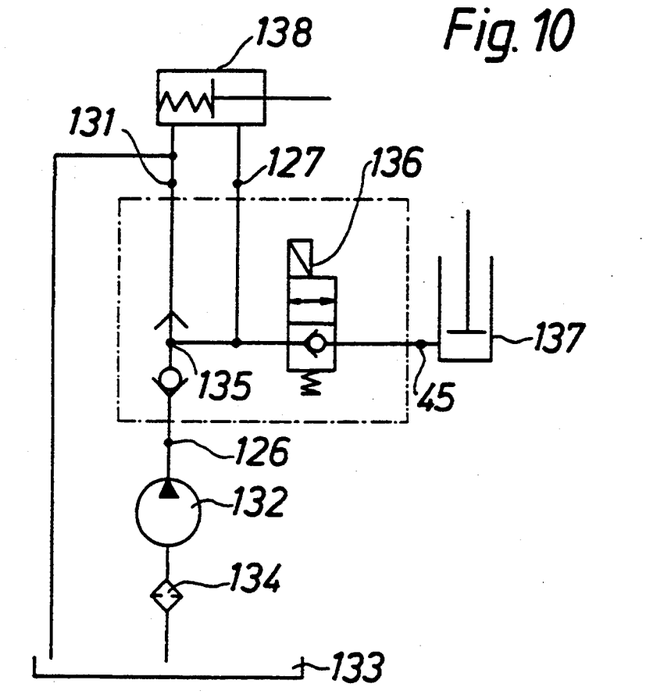
FIG. 10 is a hydraulic circuit diagram of a load platform control in which the threaded insertion valve of FIG. 9 may be used.

A possible application of the valve of FIG. 9 has been depicted in FIG. 10. A hydraulic pump 132 delivers hydraulic oil from a tank 133, a suction filter 134 and a change-over valve 133 by way of a magnetically releasable checkvalve 136 to a lifting cylinder 137 of a pivotable loading platform (not shown). It also directly delivers hydraulic oil to a pivot cylinder 138 of this loading platform. The second connection of the change-over valve 135 leads back to the tank 133.

When the lifting cylinder 137 is extended the checkvalve 136 and the change-over valve 135 are opened thus closing the return conduit from the change-over valve 135 to the tank 133. In the extended position of the lifting cylinder 137 pressure exerted by the loaded lifting cylinder 137 on the hydraulic system is compensated or concentrated by the checkvalve 136, whereas the pivot cylinder 138, because of its spring bias, is receding again. When the checkvalve 136 is released hydraulic oil will slowly return to the tank 133 by way of the conduit bore 131.

The cartridge valve in accordance with the invention assumes the functions of those elements compiled within the area enclosed by the dash dotted line, the connecting points being identified by the same reference numerals as the valve connections in FIG. 9. In the valve in accordance with the invention the valve gaps 120, 124 and 128, 129 assume the function of the change-over valve 135, and the valve gap 27''', 28''' assumes the function of the releasable checkvalve 136.

If the valve in accordance with the invention is used for controlling the lifting cylinder of a scissors-type platform the connection 127 will not be necessary.

As can be seen the threaded insertion valve in accordance with the invention is suitable for, i.e. may easily be adjusted or converted to accommodate a great many different conventional kinds of valves. The depicted provisions of the flanged part with actuator apparatus and of the threaded insertion part with valve seat body or valve spindles exemplify but a few special possible applications of the invention.

What is claimed is:

1. Threaded insertion valve with a substantially tubular threaded insertion part provided with an external thread for screwing into a valve receptacle and with a flanged part abutting the threaded insertion part and formed integral therewith and provided with a central bore for penetration of a valve spindle, characterized by the fact that the threaded insertion part (2) is provided with an internal thread (21) for screwing in an exchangeable substantially tubular valve seat body (24'''') which consists of a tubular part (23'''') provided at an end with an external thread (22) and on the inner side of which there is provided a first annular shoulder (27''') which forms a seat for a first valve cone (28''') controlled by the valve spindle (7'), the tubular part (23''') being provided in the region between the first annular shoulder (27''') and the external thread (22) with radial fluid discharge openings (45), the tubular part (23'''') being extended at its end opposite the external thread for receiving a sleeve (119) with a sliding seat the face end of which forming a seat for a spring biased second valve cone (124) which is moveable independently of the first valve cone (28'''), an external portion (128) of the sleeve (119) and a second annular shoulder (129) of the tubular part (23'''') forming a further valve gap, the tubular part (23'''') being provided with at least one fluid discharge opening (131) in the region between this valve gap and the region of engagement (130) with the sleeve (119).

2. Threaded insertion valve in accordance with claim 1, characterized by the fact that the tubular part (23'''') is provided with at least one fluid discharge opening (127) in the region between the first annular shoulder (27''') and the second annular shoulder (129).

3. Threaded insertion valve in accordance with claim 2, characterized by the fact that the spring (122) for biasing the second valve cone (124) is supported by an internal abutment (123) of the tubular part (23'''').

4. A threaded insertion valve, comprising:
 a substantially tubular threaded insertion part (2) provided with external thread means (4) adapted to mate with corresponding thread means of a valve receptacle;
 a flanged part (3) unitary with and abutting the threaded insertion part (2);
 means comprising a bore (3) having internally threaded first and second sections respectively extending in axial alignment through the flanged part and the threaded insertion part;
 substantially tubular valve seat body means (24) threadedly mounted at one end in one of the first and second sections and provided with interior annular shoulder means (27) of given diameter, spaced from said one end;
 valve spindle means (7) axially moveable in the first and second sections and comprising conical surface means (28) in facing alignment with the annular shoulder means (27) and having a diameter in excess of the diameter thereof; and
 actuator means (11) operatively connected to the valve spindle means (7) and comprising substantially tubular housing means (10) threadedly mounted in the other of the first and second sections, for moving the conical surface means (28) relative to the annular shoulder means (27).

5. The valve of claim 4, wherein the valve seat body means (24) comprises radial fluid port means (30) intermediate the one end and the annular shoulder means (27).

6. The valve of claim 5, wherein the valve seat body means (24') comprises concentrically arranged outer (23') and inner (23'') tubular parts, the outer tubular part (23') being provided with an abutment at one end and with an annular shoulder (27') adjacent the other end, and wherein the inner tubular part (23'') is provided at one end with a flange (36) radially extending over said abutment and at its other end with an annular shoulder (27'') spaced apart from the annular shoulder (27') of the outer tubular part (23'), and wherein the valve spindle means (7) is provided with further conical surface means (28'') in facing relationship with the annular shoulder means (27'') of the inner tubular part (23''), the inner and outer tubular parts being provided with coaxially aligned radial fluid port means (37) and the outer tubular part (23') being provided with further radial fluid port means (38) intermediate its annular shoulder means (27') and the annular shoulder means (27'') of the inner tubular part (23'').

7. The valve of claim 4, wherein the first section bore means (6) is provided with an inwardly protruding shoulder means (14).

8. The valve of claim 7, wherein the actuator means (11) comprises bushing means (17) including flange means (15) secured between the inwardly protruding shoulder means (14) and the valve seat body means (14).

9. The valve of claim 8, wherein the bushing means (17) is positioned in the tubular housing means (10) and is axially displaced from the flange means (15).

* * * * *